United States Patent [19]

Stevens

[11] Patent Number: 4,539,910
[45] Date of Patent: Sep. 10, 1985

[54] IGNITER PELLET CUP

[75] Inventor: George L. Stevens, Ogden, Utah

[73] Assignee: Morton Thiokol, Inc., Chicago, Ill.

[21] Appl. No.: 533,167

[22] Filed: Sep. 19, 1983

[51] Int. Cl.³ .............................................. F42B 4/06
[52] U.S. Cl. .................................. 202/349; 102/352;
102/380; 102/202; 102/287; 60/256
[58] Field of Search ............... 102/202, 287, 380, 349,
102/352; 60/256

[56] References Cited

U.S. PATENT DOCUMENTS

| | | | |
|---|---|---|---|
| 2,995,088 | 8/1961 | Asplund | 102/202 |
| 3,570,405 | 3/1971 | Heady, Jr. | 60/256 X |
| 3,581,662 | 6/1971 | Grebert | 102/202 |
| 3,729,935 | 5/1973 | Fletcher | 102/380 X |
| 4,080,901 | 3/1978 | Heier et al. | 102/202 X |
| 4,498,292 | 2/1985 | White | 102/202 X |

Primary Examiner—Peter A. Nelson
Attorney, Agent, or Firm—Gerald K. White

[57] ABSTRACT

A consumable sealed plastic cup containing ignition pellets is assembled into end cap at the forward end of a solid fuel rocket motor with sufficient clearance to allow leak test gas to bypass it and thereby expose the port seals of the through bulkhead initiators for leak checking.

7 Claims, 1 Drawing Figure

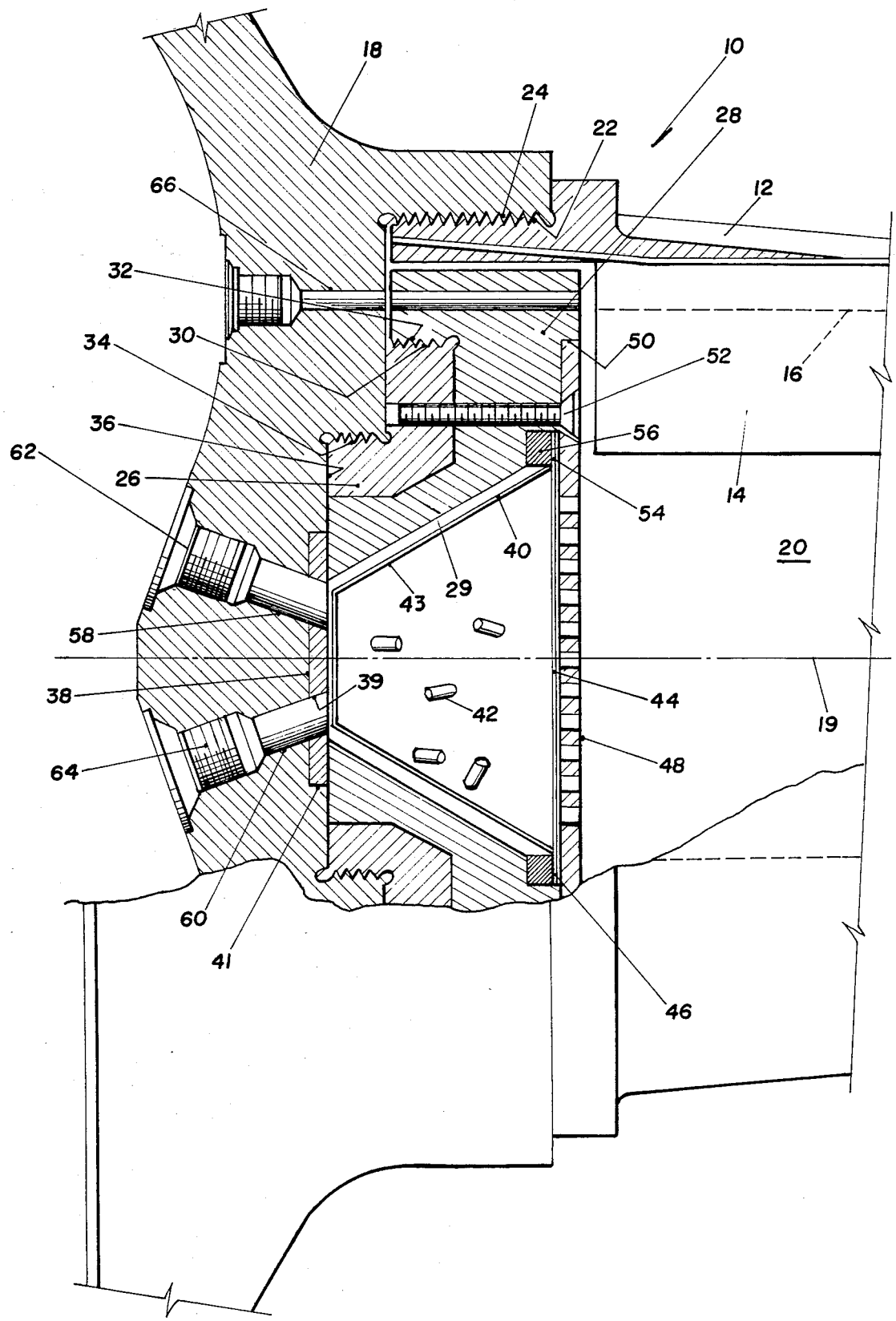

IGNITER PELLET CUP

The U.S. Government has rights in this invention pursuant to Contract No. N0003081C0081 with the U.S. Navy.

BACKGROUND OF THE INVENTION

1. Field of the Invention

The present invention relates to an improvement in igniters for solid fuel rocket motors that has particular utility when leak testing the port seals of the igniter through bulkhead initiators during motor leak tests.

2. Description of the Prior Art

A conventional igniter for solid fuel rocket motors is a miniature rocket motor that is known in the art as a "pyrogen" igniter. Typically, a pyrogen igniter is mounted in the forward end of a rocket motor through a hole in the propellant. The igniter is activated by a through bulkhead initiator, known in the trade as a TBI, that is sealed in a port provided in the bulkhead of the forward closure of the motor. Each through bulkhead initiator includes a detonating cord which translates detonation on the input side which is external of the motor to deflagration on the output side, internally of the motor. The hot gases that are thus produced ignite an ignition charge consisting of ignition pellets. The ignition pellets are contained in a sealed cavity in a sealed end cap at the forward end of the motor.

A problem in solid fuel rocket motors with such igniters has been an inability to leak test the through bulkhead initiator port seal during motor leak tests. This is because the end cap and the ignition charge cavity are sealed and present a barrier to the leak test gas.

SUMMARY OF THE INVENTION

An object of the invention is to provide an improvement in igniters of the pyrogen type for avoiding the above-mentioned problem during solid propellant rocket motor leak tests.

This objective is accomplished, according to the invention, by packaging the ignition pellets in a consumable sealed plastic cup. The plastic cup is assembled into the end cap at the forward end of the motor with sufficient clearance to allow leak test gas to bypass it and thus expose the port seals of the through bulkhead initiators for leak checking. The plastic cup also serves as an environmental seal to prevent moisture and other vapors from invading the pellet chamber.

The plastic cup may be made from injection molded polyethylene. After the pellets are installed in the cup, a plastic cover, for example, of polyethylene, is heat sealed to a flange of the cup. This provides an ignition pellet package which is sealed against the environment but will not impede or interfere with the ignition process. The plastic cup is consumed during burning of the ignition pellets.

BRIEF DESCRIPTION OF THE DRAWING

Having summarized the invention, a detailed description follows with reference being made to the accompanying single FIGURE of drawing which forms part of the specification and comprises a partial cross sectional view showing the igniter of the present invention installed in the forward end of a solid fuel rocket motor.

DESCRIPTION OF THE PREFERRED EMBODIMENTS

Referring to the drawing, the numeral 10 generally designates a solid fuel rocket motor. The rocket motor 10 includes a generally cylindrical case 12 containing a hollow case bonded propellant grain 14 which, typically, may have an internal star-shaped configuration, as indicated by the dotted line 16, with an enlarged cavity, not shown, at the aft end. At the forward or head end, the motor case 10 is closed by a closure or dome 18. Closure 18 is positioned symmetrically with respect to the coincident longitudinal axis 19 of case 12 and of the motor 10 and may have a configuration that is best suited to the intended operational requirements of the rocket motor 10. As illustrated in the drawing, closure 18 is shown as being an inverted design, that is, dished inwardly toward the combustion chamber 20 of the motor 10. The manner of attachment of closure 18 to the forward end of case 12 may be by means of screw threads such as external threads 22 provided on the end of case 12 and internal screw threads 24 provided on closure 18. The screw threads 22 and 24 engage and lock the closure 18 to the forward end of case 12.

Attached to the inner side of closure 18 by an adaptor ring 26 is a generally cylindrical end cap 28. End cap 28 has an opening or cavity therein, designated 29, that has the shape of a frustum and is symmetrically positioned with respect to the longitudinal axis 19 of the motor 10. Cavity 29 is so oriented that the end thereof having the smaller plane area is adjacent the inner wall of closure 18. External screw threads 30 provided on ring 26 engage with internal screw threads 32 on end cap 28 to lock the end cap 28 to the ring 26. Additionally, external screw threads 34 on ring 26 engage with internal screw threads on the cylindrical wall of a recess 36 provided on the inner side of closure 18 to lock the ring 26 to the closure 18. Desirably, as shown, a circular plate of heat insulating material 38 having perforations 39 therein is provided in a recess 41 in closure 18 between the closure 18 and a central area of the end cap 28.

Positioned within the cavity 29 in end cap 28 is a sealed plastic cup 40 having the shape of a frustum matching the shape of the cavity in end cap 28. Cup 40 is made of injection molded polyethylene and forms a chamber 43 containing ignition pellets 42. After the pellets 42 are placed in cup 40, a cover of polyethylene film 44 is heat sealed to a flange 46 provided at the open end of the cup 40. The cup 40 is assembled into the opening in the end cap 28, being retained therein by a perforated plate 48. Plate 48 is positioned in a recess 50 in the end cap 28 and is attached to the end cap 28 by a ring of bolts 52. Desirably, a ring spacer 54 positioned in a recess 56 in the end cap 28 may be provided for cooperation with the flange 44 of cup 38 and the perforated plate to hold the cup in in the assembled position with clearance for leakage of gas past the outer conical wall of the pellet cup 40 and the wall of cavity 29 in end cap 28. Through bulkhead initiator ports 58 and 60 which communicate with cavity 29 in end cap 28 by way of perforations 39 in plate 38 are provided in closure 18. As shown in the drawing, cavity 29 is so oriented that the smallest end thereof is in communication with the ports 58 and 60. A through bulkhead initiator 62 and 64 may be positioned in the ports 58 and 60, respectively, for enabling activation of the ignition pellets 42 in cup 40. Two through bulkhead initiators 62 and 64, instead of one only, are provided for redundancy. The through bulkhead initiators 62 and 64 may be attached to the closure 18 by engaging screw threads and provide the pressure seal between the inside and the outside of the rocket motor 10. An additional port, as shown at 66, may be provided for the attachment of a suitable pressure measuring instrument for measuring the pressure of the motor combustion chamber.

When it is desired to ignite the ignition pellets 42, an explosive output ordnance initiator, not shown, initiates confined detonating fuzes, not shown, which terminate at the through bulkhead initiators. Each through bulkhead initiator consists of a thin metal bulkhead integral with its housing with a small explosive charge on both the inside and outside of the bulkhead. A donor explosive charge on the outer side of the initiator is detonated by the output from the confined detonating fuze. The shock wave produced by the donor explosive passes through the metal bulkhead without breaking it and initiates detonation in a receptor explosive charge on the other side of the barrier. This explosive receptor charge initiates burning in a flame output charge in the through bulkhead initiator. The flame output ignites the ignition pellets 42 through the plastic wall of the pellet cup 40. The plastic cup 40 is consumed during the burning of the ignition pellets 42. Burning of the ignition pellets 42 produces hot gases that are discharged through the perforations in perforated plate 48 to ignite the solid propellant 14.

Thus, there has been provided, according to the invention, an improvement in pyrogen type igniters for solid propellant rocket motors. The improvement comprises an igniter pellet cut that is installed in an ignition charge cavity in the end cap 28 at the forward end of the motor in such a manner that the end cap 28 and the ignition charge cavity are not sealed, and hence, do not present a barrier to leak test gas when it is desired to leak test the seals of the through bulkhead initiator ports 58 and 60. Specifically, the pellet cup 40 is installed in the cavity in the end cap 28 with sufficient clearance to allow leak test gas to bypass it and thus expose the seals of the through bulkhead initiators in ports 58 and 60 for leak testing, thereby enabling such leak tests during motor leak tests. The ignition pellet cup 40 is sealed against moisture but will not impede or interfere with the ignition process. The cup 40 is consumed during the burning of the ignition pellets 42.

As those skilled in the art will understand, the construction and installation of the pellet cup 40 in the rocket motor 10 is also applicable to the second stage igniter of a multi-stage rocket motor.

What is claimed is:

1. A rocket motor having a casing containing solid propellant and including an end cap and a closure for the casing, the closure being attached to the forward end of the casing and having an inner wall and an outer wall and including at least one port extending between the inner and outer walls with a through bulkhead initiator sealed in the port, the end cap being attached to the inner wall of the closure and having a cavity formed therein with the cavity in communication with the port, and further including an igniter comprising a plastic cup having a chamber containing ignition pellets and positioned in the cavity in the end cap with clearance between said plastic cup and the cavity being provided to allow leak test gas to bypass said cup and thus expose the seal of the through bulkhead initiator for leak checking.

2. A rocket motor as specified in claim 1 wherein said plastic cup is sealed to prevent moisture and other vapors from entering the chamber containing ignition pellets.

3. A rocket motor as specified in claim 2 including a perforated plate attached to the end cap and positioned to retain said plastic cup in the cavity thereof.

4. A rocket motor as specified in claim 1 wherein the shape of said plastic cup matches the shape of the cavity and the plastic cup includes a flange at the open end, and
   wherein a cover of plastic film is heat sealed to the said flange to seal said ignition pellets against moisture.

5. A rocket motor as specified in claim 4 wherein the plastic of which said plastic cup and said cover of plastic film are made in polyethylene.

6. A rocket motor as specified in claim 4 wherein the shape of said plastic cup and that of the cavity is that of a frustum, the plastic cup and the cavity being oriented with the smaller plane area thereof facing said closure.

7. A rocket motor as specified in claim 6 including a perforated plate and a spacer, said spacer and flange of said plastic cup being positioned in a recess in the end cap and retained therein by said perforated plate with the said flange positioned between said spacer and said plate, said plate being attached to the end cap.

* * * * *